Patented June 6, 1944

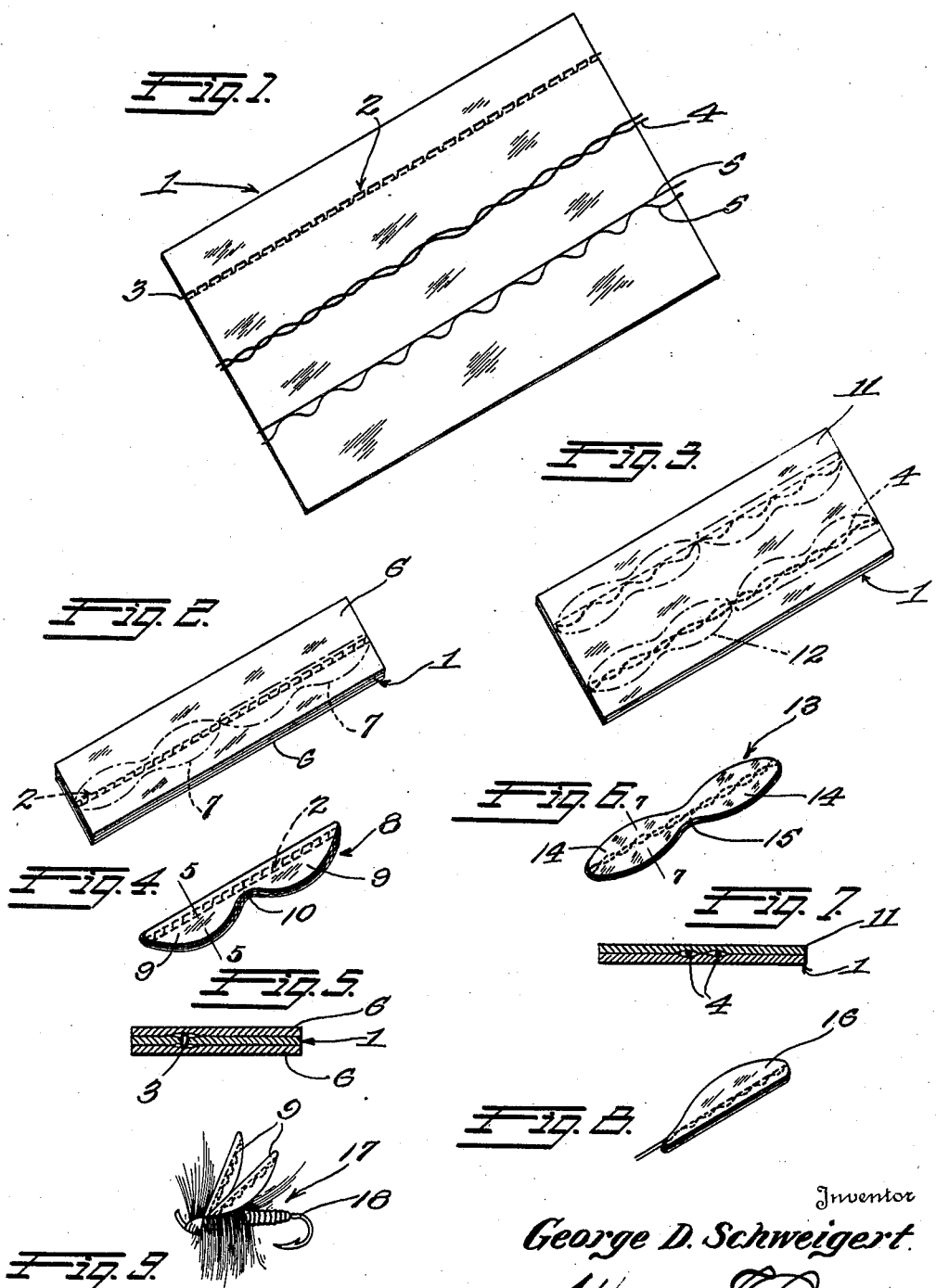

2,350,572

UNITED STATES PATENT OFFICE 2,350,572

FISHING LURE AND METHOD OF MAKING SAME

George Deming Schweigert, Denver, Colo.

Application November 18, 1941, Serial No. 419,641

10 Claims. (Cl. 43—48)

This invention relates generally to the class of fishing and trapping and pertains particularly to improvements in fishing flies, baits or lures.

Fishing flies are usually built of colored feathers which are bound or otherwise suitably secured on a hook and they are designed to simulate natural flies and other insects and so serve as artificial bait or lure to attract and catch fish.

The effectiveness of artificial flies and other artificial bait depends upon the degree of prefection in which they imitate and simulate in shape, size, form, color and other ways as well as in movements in the water, the natural insects or small forms of animal life upon which the fish feed and it is, of course, well known that in using these artificial baits the fisherman must continually cast the bait onto and into the water and "play" the same in a manner to cause the inanimate bait to appear animated and simulate the movements of the insect or animal which it imitates. This casting and playing of the bait calls for construction which must be durable and at the same time it is desirable that the cost of producing such a durable construction be held to a minimum.

Efforts have been made to treat the feathers from which artificial flies are built, in various ways to prevent the same from becoming torn or frayed after short use but the different methods of so treating the feathers have undesirable features.

The principal object of the present invention is to provide a new and novel fly and method of constructing the same in which the wings are constructed of a material and in a manner to stand up under long continual use without losing their imitative value.

Another object of the invention is to provide a wing construction and method of forming the same, for artificial flies from a transparent or translucent tough sheet material preferably such as that marketed under the trade name "Pliofilm" which is described as being composed entirely or largely of a rubber derivative, but sheets of synthetic resin or cellulosic material, such as viscose, may be used, and which, by reason of the method of forming the wings, is light but tough or durable and closely imitates the shiny character of the wings of small insects whereby it forms a perfect imitation of such wings for the production of life-like flies.

Another object of the invention is to provide artificial fly wings and a method of forming the same from sheet material of one of the types stated by the combining therewith of threads, strands or cords of suitable material and color to produce the veining or striping found in the wings of living insects.

The invention will be best understood from a consideration of the following detailed description taken in connection with the accompanying drawing, it being understood, however, that the invention is not to be considered as limited by the specific illustration or description but that such illustration and description constitute a preferred embodiment of the invention.

In the drawing:

Fig. 1 illustrates several methods of applying threads or strands to a sheet of the synthetic resin or cellulosic material in the carrying out of the first step of the method.

Fig. 2 illustrates the method of building up the sheet where the strands or threads are stitched in the base sheet.

Fig. 3 illustrates the method followed in building up the sheet where the strands or threads are merely laid on or cemented to the surface of the base sheet.

Fig. 4 illustrates one form of completed wing cut from the built up sheet shown in Fig. 2.

Fig. 5 is a section on the line 5—5 of Fig. 4.

Fig. 6 illustrates a form of wing cut from the built up sheet shown in Fig. 3.

Fig. 7 is a sectional view on the line 7—7 of Fig. 6.

Fig. 8 illustrates a single wing form adapted to be tied to the hook.

Fig. 9 illustrates a lure or artificial fly constructed in accordance with the present invention with the use of the built up wings.

Referring now more particularly to the drawing the numeral 1 designates a sheet or film of a synthetic resin, a cellulose material, or the marketed material known as "Pliofilm" which is defined in Patent No. 1,989,632 of January 29, 1935, as rubber hydrochloride. In carrying out the present invention this sheet or film of material which may be transparent or translucent or given any suitable coloring, has a number of threads or filaments of suitable material and of suitable color, applied thereto in any one of several different ways. For example, such threads or filaments may be sewed into the film, as indicated at 2, the thread or filament itself being indicated by the numeral 3. Instead of sewing the thread or filament into the film a number of strands 4 may be laid across the surface of the film in irregular order, as shown, or any desired designed or fixed arrangement may be employed as is shown in the arrangement of the threads or filaments 5 where one is laid on a straight line and the other is of wavy form and disposed against the straight thread. Numerous variations of the arrangement shown may be made without departing from the spirit of the invention and also for the purpose of producing different designs in the finished wings to simulate veins or coloring lines.

Where the procedure of stitching the thread or filament in the film body 1 is followed there are placed upon or against opposite faces of the film or sheet 1 covering sheets or films 6 of the same material and the three sheets are caused to tightly adhere together either by the use of suitable cement or by the application of pressure under heat and in this way the threads or filaments are thoroughly protected. This composite sheet or laminated sheet is then cut by means of suitable dies or in any other suitable manner along the lines 7 of Fig. 2 to produce a completed dual wing unit 8, the two wings 9 of which are joined together at adjacent ends by the narrow portion 10 which portion is applied to the hook in building up the fly so that the two wings 9 will stand up in a natural manner. As previously stated, any desired form or configuration may be given to the wings thus formed and the stitching carried by the central film or layer 1 will show thru the covering films 6. The stitched in filament or thread not only suggests vein or ribbing structure for the wing but it also gives strength and stability to the wing so as to maintain it not too rigidly or stiffly in position. As will also be readily appreciated, by increasing the amount of stitching thru the wing greater stiffness may be given thereto and also its resistance to tearing is increased. The stiffness of the wing can also be increased or decreased by changing the number of layers of film used in building up the wing structure.

In carrying out the method according to the illustration given in Figures 3, 6 and 7 only two sheets of the film may be employed if desired since by this arrangement the threads or filaments can be completely encased and protected from wet by applying only the one sheet of film 11 over the surface of the base sheet upon which the threads or filaments are initially placed.

In the initial step of locating the threads or filaments upon the base sheet 1 these may be merely laid on and secured in place by the cementing of the covering sheet 11 or they may be cemented in place when first applied to the base sheet 1 so that when the covering sheet is applied and made to adhere to the base sheet the threads or filaments will be doubly secured. This method allows for the formation of a finished wing of thinner form and, therefore, more flexibility than the method illustrated in Figures 2, 4 and 5 where three sheets of film are employed. As in the case of the three layer construction the two layer construction is stamped or cut-out in any suitable manner, along the lines 12 to form completed dual wing units, one of which is shown in Fig. 6 and indicated generally by the numeral 13, and in this unit the individual wings are indicated by the numeral 14, the same being joined at adjacent ends by the constricted portion 15.

In cutting out the wings the same may be made as single units, if desired, instead of as dual units, as shown in Figures 4 and 6. Such a single unit is shown in Fig. 8 and indicated generally by the numeral 16 and the threads or filaments may be initially extended beyond the base sheet, as shown in Fig. 1, so that the single wing unit when cut-out can be left with the ends of the threads extended and these used in tying the wing to the hook.

Fig. 9 illustrates a form of artificial fly which may be constructed by the use of the film material herein described. This fly is indicated generally by the numeral 17 and it will be seen that when the wings are applied, whether they be of the dual type or the single type the part connecting the wings together and joining them to the hook body 18 will be completely covered and hidden by the material applied to the hook to build up the body of the fly.

The synthetic material or rubber derivative sheets or films provide a thin, light but tough and durable substance for the making of artificial fly wings and, in addition, such material has a shiny surface which is a characteristic of the wings of small insects and it also creates the proper natural light refraction under the type of construction described so that it naturally has many of the attributes of natural insect wings.

By the present method of applying threads or filaments to the material additional strength is given to the wing and also by judicious arrangement of the threads they may be made to resemble the veins and coloring lines of the natural wings.

Another feature important to the present invention is that the material adds buoyancy to the lure as it has a waterproof quality which feather flies do not have unless continuously dipped in oil. The wings and other parts of the artificial lures constructed from material of the character stated also have strength, flexibility and durability not possessed by natural feather parts particularly where tied or fastened to the hook, the point where the greatest strength is required. A wing or other part cut from the material of the base sheet could be readily fastened to the hook but without the reinforcing threads or filaments, particularly at the point where the wing or other part is fastened, the part would cut or break after a few casts and certainly after a fish had been hooked. Thus in the present invention there is avoided the use of materials which split and tear easily such as natural feathers and there is also avoided the necessity of using oils or waxes for waterproofing the wings such as is necessary in using natural products such as feathers and the like. The artificial lures can, therefore, be made much lighter and can be produced more economically than is possible with the use of natural products in the building up of a wing structure or other parts of an artificial lure.

The illustration and description thus far given set forth the use of a base sheet of cellulosic material such as viscose, a synthetic resin such as one of the numerous plastics at present produced, or a rubber derivative product such as "Pliofilm," carrying threads or filaments and having covering sheets to protect such threads or filaments. However, it is contemplated as being within the scope of the present invention to cover the base sheet and the threads or filaments applied thereto with other sheets of a character different from that of the base sheet or by an applied coating of a fluid from one of the materials which will dry out to form a film or sheet over the base sheet and provide a protective covering for the threads. There would thus be formed laminations of the selected plastic or artificial resin material between which are firmly imbedded the threads or filaments which function to give a natural appearance to the part and also to strengthen the same in the manner previously stated.

While the present illustration and description have been confined to the construction or formation of wings of insects it will, of course, be apparent, and it is intended to be understood, that other parts of flies and artificial lures in which feathers are ordinarily employed, may be made in accordance with the present invention, such as the hackle and the like and also it will be obvious that the present process may be employed to form various forms of marine life, such as minnows, particularly in connection with the making of tails, fins and other similar parts.

What is claimed is:

1. A fishing lure having parts formed of laminations of a synthetic material of tough, water impervious character, and elements interposed between said laminations and visible through the same to simulate markings common to natural parts of small insect and animal life.

2. As an article of manufacture a laminated body consisting of a sheet of rubber hydrochloride having threads, filaments and like materials attached thereto and protected by an overlaid covering of material of a transparent or semi-transparent character.

3. An artificial fly having body parts, such as wings and the like, formed of a tough, water impervious synthetic material with threads of a color contrasting with the said synthetic material combined with such synthetic material and extending outwardly from the point of attachment of the body parts to the body of the fly.

4. An artificial fly having body parts, such as wings and the like, formed from a sheet of rubber hydrochloride, with threads of a color contrasting with said material, embedded in the material and extending lengthwise of the parts.

5. An artificial fly having body parts, such as wings and the like, formed of laminations of rubber hydrochloride, with threads embedded between the laminations and having a color contrasting with the color of the material to be seen therethrough and functioning to reinforce the material against tearing and to simulate veins and color markings of natural insect parts.

6. A wing part, hackle and other insect and animal part for fishing lures consisting of, a thread interposed and secured between two sheets of a synthetic material of tough, water impervious character and formed for attachment to a fish hook.

7. Artificial parts of insect, marine and other small animal life for use in forming fishing lures, consisting of a sheet of a synthetic material of tough, water impervious character, a thread sewed into said sheet, a covering layer of material similar to said sheet applied to opposite sides of the sheet, and a bonding means between the sheets.

8. As a new article of manufacture, an imitative animal life part for use in making artificial lures comprising a flat body consisting of a synthetic material of tough, water impervious and transparent or semi-transparent character, with a thread embedded in the material in simulation of a marking which is common to natural insect and animal life parts.

9. A fishing lure formed entire or in part from material selected from the group comprising a rubber derivative, cellulosic products of which viscose is an example, and synthetic rubber; and reinforcing materials in the form of threads combined with the said material.

10. A fishing lure formed entire or in part from material selected from the group comprising a rubber derivative, cellulosic products of which viscose is an example, and synthetic rubber; and threads embedded in parts of the material to form reinforcement and to simulate markings of natural insect parts.

GEORGE DEMING SCHWEIGERT.